United States Patent
Jain et al.

(10) Patent No.: US 6,390,948 B1
(45) Date of Patent: May 21, 2002

(54) TRANSMISSION RATIO CHANGE CONTROL DURING MODE TRANSITIONS IN LEAN BURN/DISI ENGINES

(75) Inventors: Pramod K. Jain, Farmington Hills; Gopichandra Surnilla, West Bloomfield, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/614,838

(22) Filed: Jul. 12, 2000

(51) Int. Cl.⁷ .............................................. F16H 59/30
(52) U.S. Cl. ....................................................... 477/121
(58) Field of Search ................................ 477/115, 121

(56) References Cited

U.S. PATENT DOCUMENTS

| | | |
|---|---|---|
| 5,209,213 A | 5/1993 | Miyashita et al. |
| 5,243,881 A | 9/1993 | Hayashi |
| 5,249,484 A | 10/1993 | Matsuoka et al. |
| 5,295,416 A | 3/1994 | Miyashita et al. |
| 5,443,594 A | 8/1995 | Takada et al. |
| 5,468,195 A | 11/1995 | Kashiwabara |
| 5,603,673 A | 2/1997 | Minowa et al. |
| 5,642,709 A | 7/1997 | Ozaki et al. |
| 5,846,157 A | 12/1998 | Reinke et al. |
| 6,000,378 A | 12/1999 | Minowa et al. |
| 6,063,004 A | * 5/2000 | Ibamoto et al. ................ 477/47 |
| 6,188,944 B1 | * 2/2001 | Kolmanovsky et al. ....... 701/54 |

* cited by examiner

*Primary Examiner*—Dirk Wright
(74) *Attorney, Agent, or Firm*—Allan J. Lippa

(57) ABSTRACT

Systems and methods for coordinating control of a DISI engine and automatic transmission determine the current and next engine operating modes and selectively modify or delay a requested transmission ratio change based on the current operating mode of the engine. Ratio changes requested during closed loop stoichiometric operation and during NOx purging cycles are commanded without delay while ratio changes requested during transitions between lean mode operation and stoichiometric operation may be delayed or the current operating mode extended to permit the ratio change to complete. Torque modulation may be provided during the ratio change using air, fuel, and/or spark control depending upon the engine operating mode.

20 Claims, 3 Drawing Sheets

TRANSMISSION RATIO CHANGE CONTROL DURING MODE TRANSITIONS IN LEAN BURN/DISI ENGINES

TECHNICAL FIELD

The present invention relates to systems and methods for controlling a powertrain including a lean burn/DISI engine and automatic transmission relative to ratio changing and $NO_x$ purging cycles.

BACKGROUND ART

As known, lean burn internal combustion engines including direct injection, spark ignition (DISI) engines may be operated in various modes lean of stoichiometry where the pumping losses are reduced and the thermodynamic efficiency of the engine is increased. Lean burn/DISI engine technology provides for lean combustion which may result in significant fuel economy improvements. Catalysts, such as three-way catalysts or $NO_x$ traps, are used which absorb $NO_x$ when lean. These catalysts are periodically purged by operating rich of stoichiometry for a short duration. During cruise control and light acceleration operation, a 30–45 second lean operation cycle may be followed by a 2–3 second purge cycle, for example. During a $NO_x$ purge cycle, throttle, spark, and fuel are controlled to maintain a relatively constant engine torque to minimize any effect on vehicle performance or driveability.

For automatic transmission applications, transmission ratio changes, including gear shifts and torque converter clutch applies/releases, may be greatly affected by unpredicted or uncontrolled changes in engine torque. In addition, consistent transmission shift quality may require engine torque modulation during a ratio change. To properly control engine torque to maintain consistent shift quality, it is desirable to coordinate control of air/fuel ratio changes in the DISI engine, such as those that occur during $NO_x$ purge cycles, with shift scheduling of the automatic transmission.

SUMMARY OF THE INVENTION

An object of the present invention is to provide a system and method for synchronizing or coordinating control of a DISI engine and automatic transmission.

In carrying out the above object and other objects, advantages, and features of the present invention, a system and method for controlling a powertrain having an automatic transmission and an internal combustion engine capable of operation in at least lean burn and stoichiometric modes include determining a current operating mode for the engine, determining a next operating mode for the engine, and delaying a requested transmission ratio change if the ratio change can not be substantially completed before transitioning from the current operating mode to the next operating mode.

The present invention provides a number of advantages. For example, the present invention reduces or eliminates driveability related issues associated with interaction of an air/fuel transition of a lean burn/DISI engine and ratio change of an automatic transmission, such as occurs during periodic $NO_x$ purge cycles, for example. The present invention provides consistent and predictable gear shift quality through appropriate coordinated scheduling of ratio changes and operating modes of a DISI/lean burn engine.

The above advantages and other advantages, objects, and features of the present invention, will be readily apparent from the following detailed description of the best mode for carrying out the invention when taken in connection with the accompanying drawings.

BEST MODE FOR CARRYING OUT THE INVENTION

As will be appreciated by those of ordinary skill in the art, the present invention is independent of the particular engine technology used to implement a powertrain with a DISI engine and automatic transmission according to the present invention. For example, the present invention may be used in conventional DISI engines in addition to direct injection stratified charge (DISC) engines which may utilize conventional camshaft valve timing arrangements, variable cam timing, or variable valve timing mechanisms, for example.

Figure 1:
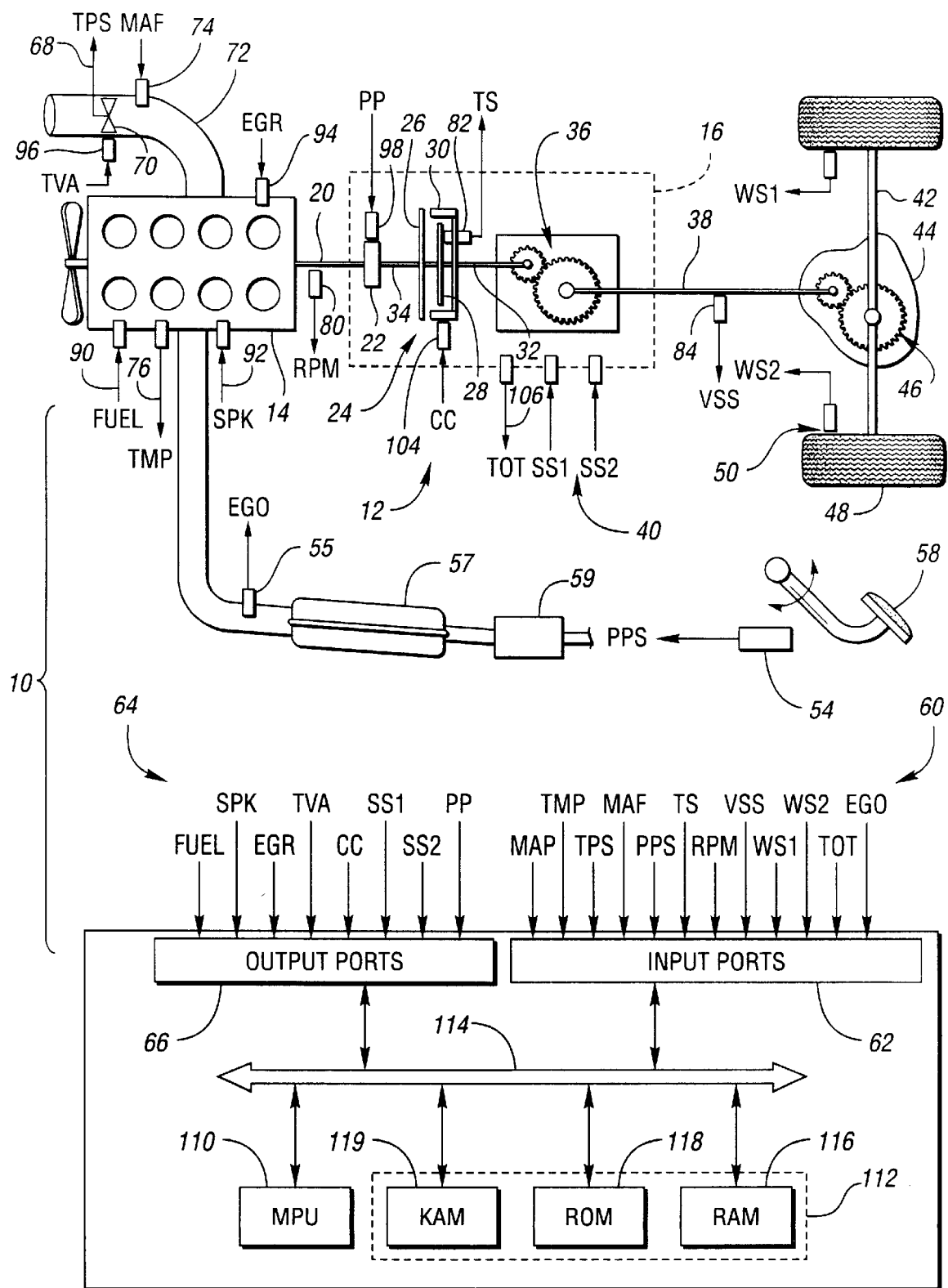
FIG. 1 is a block diagram illustrating operation of one embodiment of a system or method for controlling or synchronizing an automatic transmission ratio change with a $NO_x$ purge cycle in a DISI engine according to the present invention.

FIG. 1 provides a block diagram illustrating operation of a system or method for coordinated control of a DISI engine and automatic transmission relative to ratio change scheduling according to the present invention. The phrase "ratio change" and similar phrases are used to designate a change in the input to output ratio of an automatic transmission. As one of ordinary skill in the art will appreciate, the input to output ratio may be determined based on various input speeds, such as engine speed or turbine shaft speed, in combination with various output speeds, such as wheel speed or output shaft speed, depending upon the particular application. One or more of the input/output speeds may be measured, estimated, or inferred based on various sensors and current operating conditions. A "ratio change" is meant to encompass a change in the input to output ratio which may be effected by a gear shift or control of the torque converter, including the torque converter clutch. In the description of the preferred embodiment, any references to upshifts and downshifts are specific to a ratio change which involves a gear shift or selection of a new gear ratio while any references to locks/unlocks are specific to a ratio change which controls the torque converter clutch.

System 10 of FIG. 1 includes a vehicular powertrain 12 having an internal combustion engine 14 coupled to an automatic transmission 16. Engine 14 is preferably a direct injected, spark ignition (DISI) internal combustion engine capable of operation in one or more lean combustion modes. Powertrain 12 may also include a controller 18 in communication with engine 14 and/or transmission 16 for providing various information and control functions. Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34.

Transmission 16 includes a plurality of input-to-output ratios or gear ratios effected by various gears, indicated generally by reference numeral 36, and associated frictional elements such as clutches, bands, and the like, as well known in the art. Gears 36, in combination with torque converter 24, provide selective reduction or multiplication ratios between turbine shaft 32 and output shaft 38. Automatic transmission 16 is preferably electronically controlled via one or more shift solenoids, indicated generally by reference numeral 40.

Depending upon the particular application, output shaft 38 may be coupled to one or more axles 42 via a final drive reduction or differential 44 which may include one or more gears, as indicated generally by reference numeral 46. Each axle 42 may include two or more wheels 48 having corresponding wheel speed sensors 50.

Powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 66.

The sensors preferably include a throttle valve position sensor (TPS) 68 which monitors the angular position of throttle valve 70 which is positioned in intake 72. A mass air flow sensor (MAF) 74 provides an indication of the air mass flowing through intake 72. A temperature sensor (TMP) 76 provides an indication of the engine coolant temperature, or alternatively engine oil temperature.

As also illustrated in FIG. 1, an engine speed sensor (RPM) 80 monitors rotational speed of crankshaft 20. Similarly, a turbine speed sensor 82 monitors the rotational speed of the turbine 28 of torque converter 24. Another rotational speed sensor, vehicle speed sensor (VSS) 84, provides an indication of the speed of output shaft 38 which may be used to determine the vehicle speed based on the ratio of differential 44 and the size of wheels 48. of course, wheel speed sensors (WS1 and WS2) 50 may be used to provide an indication of the vehicle speed as well.

An accelerator pedal 52 is manipulated by the driver to control the output of powertrain 12. A pedal position sensor 54 provides an indication of the position of accelerator pedal 52, preferably in the form of counts. In one embodiment, an increasing number of counts corresponds to a request for increasing powertrain output. Preferably, redundant position sensors are used with at least one sensor having a negative slope such that a decreasing number of counts corresponds to a request for increased powertrain output. A manifold absolute pressure (MAP) sensor may be used to provide an indication of the current barometric pressure and manifold pressure. An exhaust gas oxygen sensor (EGO) 55 provides an indication of the air/fuel ratio in exhaust feedgas passing to a three-way catalyst within catalytic converter 57. A second catalyst 59 is positioned downstream of catalytic converter 57 to trap $NO_x$ in addition to $NO_x$ trapped in catalyst 57 during lean burn operating modes of engine 14. First catalyst 57 and second catalyst 59 are periodically purged as illustrated and described in greater detail with reference to FIG. 2.

Actuators 64 are used to provide control signals or to effect movement of various devices in powertrain 12. Actuators 64 may include actuators for timing and metering fuel (FUEL) 90, controlling ignition angle or timing (SPK)92, setting the amount of exhaust gas recirculation (EGR) 94, and adjusting the intake air using throttle valve 70 with an appropriate servomotor or actuator (TP) 96. Automatic transmission 16 may be selectively controlled by controlling transmission pump or line pressure using an appropriate actuator (PP) 98 in combination with shift solenoids (SS1 and SS2) 40 which are used to select an appropriate gear ratio. Automatic transmission 16 preferably includes a torque converter clutch 30 operable via an appropriate actuator or solenoid (CC) 104. Also preferably, a temperature senor 106 is provided to determine the transmission oil temperature (TOT).

Controller 18 is preferably a microprocessor-based controller which provides integrated control of engine 14 and transmission 16 of powertrain 12. Of course, the present invention may be implemented using separate engine and transmission controllers depending upon the particular application. Controller 18 includes a microprocessor 110 in communication with input ports 62, output ports 66, and computer readable media 112 via a data/control bus 114. Computer readable media 112 may include various types of volatile and non-volatile memory such as random access memory (RAM) 116, read-only memory (ROM) 118, and keep-alive memory (KAM) 120, for example. These "functional" descriptions of the various types of volatile and non-volatile storage may be implemented by any of a number of known physical devices including but not limited to EPROMs, EEPROMs, PROMs, flash memory, and the like. Computer readable media 112 includes data representing instructions executable by microprocessor 110 to implement the method for coordinated control of ratio changing and DISI engine operation according to the present invention.

Figure 2:
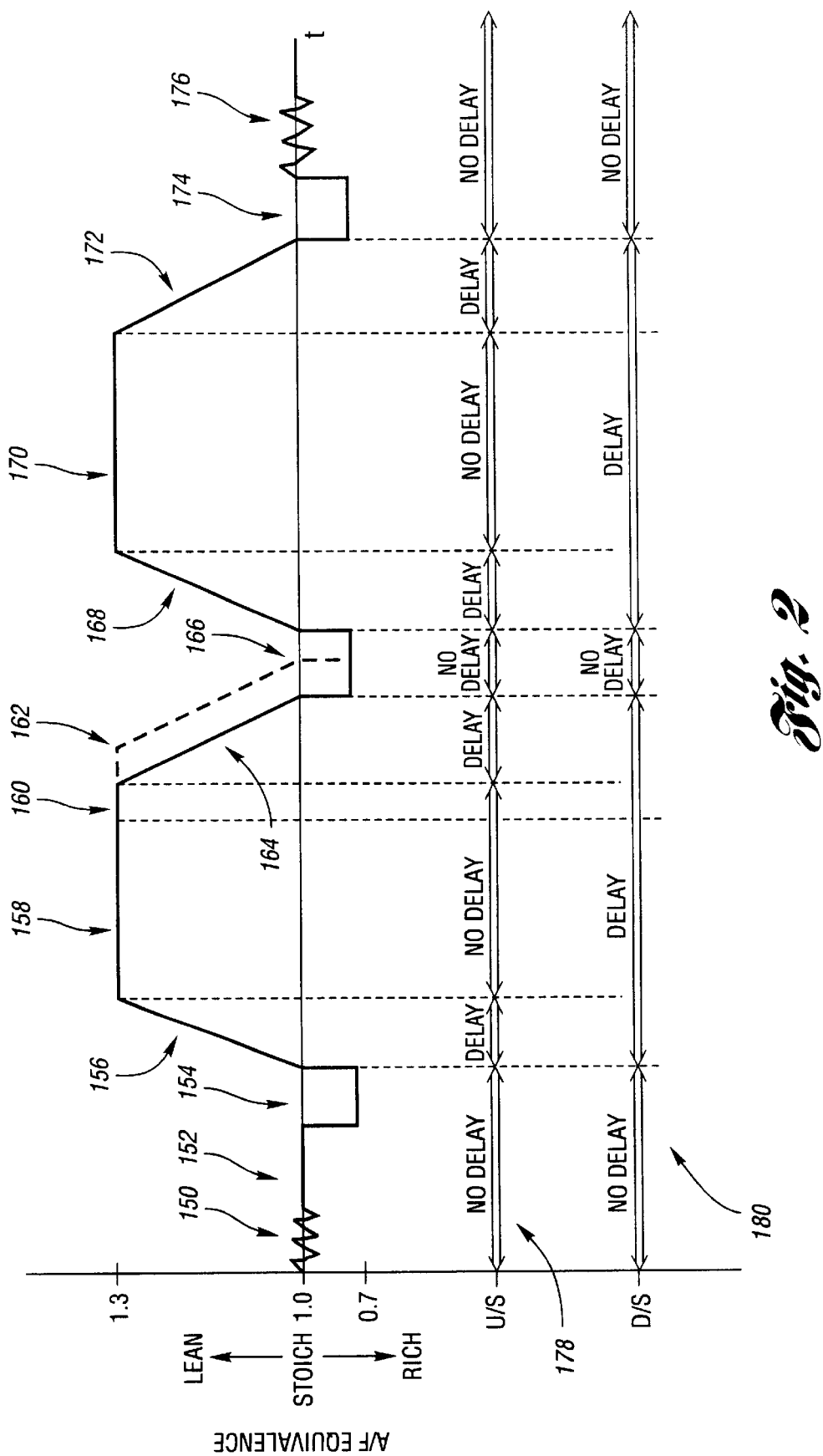
FIG. 2 is a diagram illustrating variations in air/fuel ratio and coordinated transmission ratio changing during representative operation of a DISI/lean burn engine according to the present invention.

FIG. 2 is a diagram illustrating variations in air/fuel ratio and coordinated ratio changing scheduling during representative operation of a DISI/lean burn engine according to the present invention Various operating modes for a lean burn/ DISI engine are shown with air/fuel equivalence ratios ranging between about 0.7 and 1.3 with corresponding air/fuel ratios of about 10:1 to about 19:1, respectively based on a stoichiometric ratio of about 14.6:1. During a first period of time indicated by reference numeral 150, the engine is operated in closed-loop stoichiometric mode with an equivalence ratio of about 1.0 corresponding to an air/fuel ratio of about 14.6:1. Closed-loop operation is provided by monitoring feedgas emissions using an appropriate sensor such as an exhaust gas oxygen (EGO) sensor. Airflow and/or fuel quantity is controlled to provide a stoichiometric ratio for combustion with minor variations as illustrated. A short delay 152 of about 5 seconds during stoichiometric operation is experienced before entering lean burn mode for the first time. Delay 152 is followed by a $NO_x$ purge cycle before entering lean burn mode for the first time. As described above, the $NO_x$ purge cycle is performed by periodically operating at a rich air/fuel ratio relative to stoichiometry for a short time. For example, during cruise control and light acceleration operation, a 30–45 second lean burn mode may be followed by a 2–3 second $NO_x$ purge mode 154.

A transition mode 156 ramps the current operating mode to the next operating mode 158. In this example, transition mode 156 ramps from $NO_x$ purge mode 154 through stoichiometry to lean burn air/fuel ratio 158. A representative transition time is about 150 milliseconds. The engine then operates in lean burn mode 158 for a period of time extending about 30–45 seconds, for example. As explained in greater detail below, if a ratio change is requested toward the end of lean burn mode 158 as represented by period 160, lean burn mode 158 may be extended to allow the ratio change to complete as represented by 162. Another transition 164 lasting about 150 milliseconds ramps the air/fuel ratio from the lean burn mode to a rich ratio for $NO_x$ purge mode 166. A subsequent transition 168, also lasting about 150 milliseconds, to lean burn mode 170 is followed by transition 172 where the air/fuel ratio is ramped to exit from lean burn mode when driver demanded torque is either too high or too low, for example. A $NO_x$ purge cycle 174 is then performed after exiting lean burn mode 170 and prior to entering closed-loop stoichiometric operation.

According to the present invention, transmission ratio changes are coordinated with the engine operating mode to improve driveability and provide consistent shift quality. Line 178 of FIG. 2 illustrates various periods of operation where a transmission upshift may be delayed while line 180 illustrates periods where a transmission downshift may be delayed according to the present invention. During operating in the stoichiometric and $NO_x$ purge modes represented by periods 150, 152, and 154, requested gear shifts are executed when commanded without imposing any additional delay. During stoichiometric operation mode represented by periods 150 and 152, spark, fuel, and/or airflow may be used to provide torque modulation during the gear shift for applications and/or ratio changes where torque modulation may be desired. In addition, stoichiometric operation may be extended to allow a gear shift to complete.

During a $NO_x$ purge cycle 154 before entering lean burn mode for the first time, no additional delay is imposed on the ratio change and both upshifts and downshifts are executed when commanded. If a ratio change is being executed when mode 154 ends, operation proceeds to stoichiometric mode until the gear shift is completed before beginning the transition to lean burn mode. During mode 154, spark retard and airflow control may be used for torque modulation if desired.

When transitioning to lean burn mode as indicated at 156, transmission upshifts are delayed until the start of lean burn mode 158. Depending upon the particular application, the upshift may be initiated slightly before the end of transition 156. As represented by line 180, downshifts caused by tip-in or kickdown may be delayed until the beginning of lean burn mode 158, similar to upshifts, or may be delayed until a subsequent $NO_x$ purge mode.

During operation in lean burn mode 158, predictive shift scheduling should be coordinated with the predicted mode transition. For example, if mode 158 is about to end (based on estimates), as represented by period 160, when a gearshift is commanded, the gearshift may be immediately executed with the lean burn mode 158 extended as represented by period 162 until the gearshift is completed. During this operating mode, spark retard is preferably utilized as the primary torque actuator. For lean burn applications airflow may also be used to provide torque modulation. In DISI applications, fuel is preferably used with spark to provide torque modulation during the gearshift. For a downshift caused by tip-in or kickdown, the gearshift is preferably delayed until stoichiometric or $NO_x$ purge mode.

During transition 164, both upshifts and downshifts are preferably delayed until the beginning of the $NO_x$ purge mode 166. Depending upon the particular application, some overlap may be allowed. Ratio changes requested during $NO_x$ purge mode 166 are preferably immediately executed without any additional delay imposed. Spark retard may be used to provide torque modulation during the gearshift in this mode. If $NO_x$ purge mode 166 ends during a gearshift, the engine is preferably operated in stoichiometric mode until the gearshift is completed.

Operation during transition 168 and lean burn mode 170 proceeds as described with reference to modes 156 and 158. When ramping to stoichiometric to exit out of lean burn mode based on driver demanded torque as represented by period 172, gearshifts are preferably delayed until $NO_x$ purge mode 174. No additional delay is imposed for gearshifts requested during operation in stoichiometric mode 176.

Figure 3:
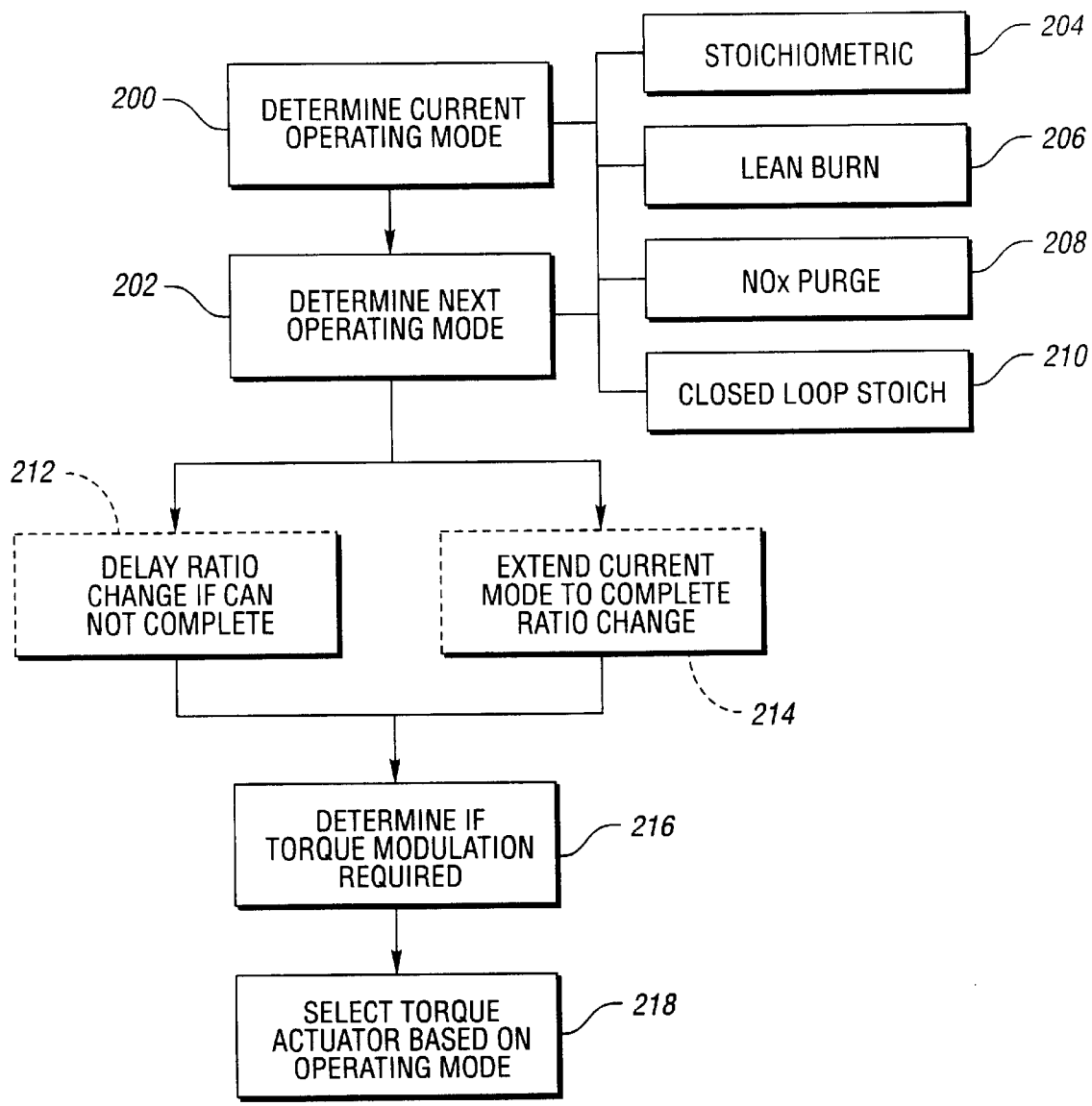
FIG. 3 is a flowchart illustrating operation of a system or method for controlling a powertrain having an automatic transmission and a DISI/lean burn engine according to the present invention.

A diagram illustrating operation of systems and methods for coordinated control of a DISI/lean burn engine and automatic transmission particularly during $NO_x$ purge cycles of the DISI engine according to the present invention is provided in FIG. 3. The diagram generally represents control logic of one embodiment of a system or method according to the present invention. As will be appreciated by one of ordinary skill in the art, the diagram may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

Referring now to FIG. 3, block 200 represents determination of the current operating mode with block 202 representing determination of the next scheduled operating mode. As described above, the operating modes may include a stoichiometric mode 204, lean burn mode 206, $NO_x$ purge mode 208, and closed-loop stoichiometric mode 210. Depending upon the current and next operating modes, block 212 may delay the ratio change if it appears that the ratio change cannot be completed before transitioning to the next operating mode, or if the ratio change may result in adverse driveability. Alternatively, block 214 represents extending the current operating mode for a sufficient time to complete the ratio change.

As described above with reference to FIG. 2, the next operating mode may be modified to accommodate the ratio change. For example, a ratio change requested during $NO_x$ purge mode which has not completed prior to the completion of the $NO_x$ purge mode may result in the next operating mode being the stoichiometric mode rather than the ramp to lean burn mode.

Block 216 determines whether torque modulation is desired or required during the ratio change. Torque modulation may be used to improve shift quality for selected ratio changes which may vary by application. Where torque modulation is used, block 218 selects the particular torque actuator based on the current operating mode and engine technology. Spark, fuel, and/or airflow control may be used alone or in combination to achieve the desired torque during the gearshift depending upon the current engine operating mode.

As such, the present invention eliminates driveability related issues associated with interaction of air/fuel transitions for lean burn/DISI engines and ratio changes of an automatic transmission. Coordinated control of ratio changing and engine operation provides a more consistent and predictable gearshift quality.

While the best mode for carrying out the invention has been described in detail, those familiar with the art to which this invention relates will recognize various alternative designs and embodiments for practicing the invention as defined by the following claims.

What is claimed is:

1. A method for controlling a powertrain having an automatic transmission and an internal combustion engine capable of operation in at least lean burn and stoichiometric modes, the method comprising:

determining a current operating mode for the engine;

determining a next operating mode for the engine; and delaying a requested transmission ratio change if the ratio change can not be substantially completed before transitioning from the current operating mode to the next operating mode.

2. The method of claim 1 further comprising:

delaying a transition from the current operating mode to the next operating mode to allow sufficient time for the ratio change to be substantially completed.

3. The method of claim 1 wherein the current operating mode or the next operating mode is the lean burn mode.

4. The method of claim 1 wherein the step of delaying a requested transmission ratio change is performed only if at least one of the current and next operating modes is the lean burn mode.

5. The method of claim 1 wherein the current operating mode is the lean burn mode and the next operating mode is the stoichiometric operating mode or a NOx purge mode, and wherein the step of delaying comprises delaying the ratio change only if the ratio change is an upshift.

6. The method of claim 1 wherein the current operating mode is the lean burn mode and the next operating mode is a NOx purge mode.

7. The method of 1 wherein the current operating mode is the stoichiometric mode, the next operating mode is the lean burn mode, the requested transmission ratio change is for an upshift, and wherein the upshift is delayed until starting the lean burn mode.

8. The method of claim 1 wherein the current operating mode is the stoichiometric mode, the next operating mode is the lean burn mode, the requested transmission ratio change is for a downshift, and wherein the downshift is delayed until beginning the lean burn mode or until beginning a subsequent NOx purge mode.

9. The method of claim 1 wherein the current operating mode is a NOx purge mode and wherein the requested transmission ratio change will not be completed before the current operating mode ends, the method further comprising operating in the stoichiometric mode until the ratio change has completed before transitioning to the lean burn mode.

10. The method of claim 9 further comprising:

modulating torque during the transmission ratio change using spark retard and airflow control.

11. The method of claim 1 wherein the current operating mode is the lean burn mode, the method further comprising modulating engine torque during the transmission ratio change using spark retard as a primary torque actuator.

12. The method of claim 11 wherein the internal combustion engine is a DISI engine and wherein modulating engine torque during the transmission ratio change further includes using fuel for torque modulation.

13. The method of claim 11 wherein the internal combustion engine is a lean burn engine and wherein modulating engine torque during the transmission ratio change includes modulating airflow for torque modulation.

14. A system for controlling a powertrain, the system comprising:

an automatic transmission;

an internal combustion engine capable of operation in at least lean burn and stoichiometric modes;

a controller in communication with the automatic transmission and the internal combustion engine, the controller determining a current operating mode for the engine, determining a next operating mode for the engine, and delaying a requested transmission ratio change if the ratio change can not be substantially completed before transitioning from the current operating mode to the next operating mode.

15. The system of claim 14 wherein the controller delays a transition from the current operating mode to the next operating mode to allow sufficient time for the ratio change to be substantially completed.

16. The system of claim 14 wherein the current operating mode is the lean burn mode and the next operating mode is the stoichiometric operating mode or a NOx purge mode, and wherein the controller delays the ratio change only if the ratio change is an upshift.

17. The system of claim 14 wherein the current operating mode is a NOx purge mode, wherein the requested transmission ratio change will not be completed before the current operating mode ends, and wherein the controller operates the engine in the stoichiometric mode until the ratio change has completed before transitioning to the lean burn mode.

18. A computer readable storage medium having stored data representing instructions executable by a computer to control a powertrain having an automatic transmission and an internal combustion engine capable of operation in at least lean burn and stoichiometric modes, the computer readable storage medium comprising:

instructions for determining a current operating mode for the engine;

instructions for determining a next operating mode for the engine; and instructions for delaying a requested transmission ratio change if the ratio change can not be substantially completed before transitioning from the current operating mode to the next operating mode.

19. The computer readable storage medium of claim 18 further comprising:

instructions for delaying a transition from the current operating mode to the next operating mode to allow sufficient time for the ratio change to be substantially completed.

20. The computer readable storage medium of claim 18 further comprising instructions for modulating engine torque during the transmission ratio change using spark retard as a primary torque actuator when the current operating mode is the lean burn mode.

* * * * *